US008743055B2

(12) United States Patent
Fei et al.

(10) Patent No.: US 8,743,055 B2
(45) Date of Patent: Jun. 3, 2014

(54) HYBRID POINTING SYSTEM AND METHOD

(75) Inventors: Yue Fei, San Jose, CA (US); Philippe Morin, Goleta, CA (US); David Kryze, Campbell, CA (US); Masaki Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 257 days.

(21) Appl. No.: 13/272,776

(22) Filed: Oct. 13, 2011

(65) Prior Publication Data

US 2013/0093674 A1 Apr. 18, 2013

(51) Int. Cl.
*G09G 5/08* (2006.01)

(52) U.S. Cl.
USPC .......................................... 345/158; 345/173

(58) Field of Classification Search
USPC .................................................. 345/156–179
See application file for complete search history.

(56) References Cited

U.S. PATENT DOCUMENTS

| | | |
|---|---|---|
| 5,666,499 A | 9/1997 | Baudel et al. |
| 7,696,980 B1 | 4/2010 | Piot et al. |
| 2003/0210286 A1 | 11/2003 | Gerpheide et al. |
| 2004/0017355 A1 | 1/2004 | Shim |
| 2006/0267934 A1 | 11/2006 | Harley et al. |
| 2007/0188458 A1 | 8/2007 | Bells et al. |
| 2009/0153500 A1 | 6/2009 | Cho et al. |
| 2010/0039394 A1 | 2/2010 | Moussavi |
| 2010/0253619 A1 | 10/2010 | Ahn |
| 2010/0315336 A1* | 12/2010 | Butler et al. .................. 345/158 |

OTHER PUBLICATIONS

Cao, Xiang, et al., "Comparing User Performance with Single-Finger, Whole-Hand, and Hybrid Pointing Devices," CHI 2010: Devising Input, Apr. 10-15, 2010, Atlanta, GA, pp. 1643-1646.
Vogel, Daniel, et al., "Distant Freehand Pointing and Clicking on Very Large, High Resolution Displays," UIST '05, Oct. 23-27, 2005, Seattle, WA, pp. 33-42.

* cited by examiner

*Primary Examiner* — Premal Patel
(74) *Attorney, Agent, or Firm* — Harness, Dickey & Pierce, P.L.C.

(57) ABSTRACT

A handheld controller which includes at least two disparate sensors, such as a motion sensor and a touchpad sensor. A processor deployed in either handheld controller or separate product implements a hybrid pointing and selection method that uses data from the first sensor to adjust the sensitivity to stimulus of the second sensor, and vice versa. The respective sensor data are thus tempered and combined to generate a cursor control signal that includes a large scale control component to control size and movement of a rough pointer region, and a fine scale control component to control position of a precise pointer within the rough pointer region.

29 Claims, 9 Drawing Sheets

Fig. 12

HYBRID POINTING SYSTEM AND METHOD

FIELD

The present disclosure relates generally to computer and consumer product user interface pointing systems. More particularly, the disclosure relates to a pointing apparatus and method that responds to multiple input sources simultaneously and collaboratively to control the position and appearance of a cursor or pointer on an electronic display.

BACKGROUND OF THE INVENTION

This section provides background information related to the present disclosure which is not necessarily prior art.

Pointing is a fundamental operation found in most graphical user interface (GUI) systems used by computers and many consumer electronics products. Typically, the user will manipulate a controller, such as a mouse, which in turn moves a computer-generated cursor on a display. The user will then move the cursor to select items of interest, navigate through many screens, explore content and the like. While use of a mouse is typical, some applications prefer gestural control where the user performs pointing using multiple body parts simultaneously and collaboratively, such as moving elbow, hand and finger to reach an object. For example, holding a remote input device, the user may make an in-the-air gesture with the controller and the gesture is translated into cursor movement on the display screen.

Current remote pointing methods suffer from the conflicting constraints of having limited range and having limited precision. A remote pointing device that has sufficient range to reach all parts of the display tends to be difficult to precisely control because the user has difficulty holding his or her hand steady once the desired cursor position is reached. Conversely, a remote pointing device that offers precise control within a predefined region of the display may not easily be able to reach other regions on the display. For example, a touch-sensitive controller may allow accurate pointing within a limited range but requires repeated swipes to move to a different region on the display, causing user fatigue.

SUMMARY

The hybrid pointing apparatus and method disclosed here overcomes the aforementioned difficulties by allowing multiple input sources, such as in-the-air hand movement and finger-pointing on a touchpad surface, to work together in a collaborative fashion.

The disclosed pointing apparatus or controller facilitates user interaction with displayed elements on an electronic display of the type having a cursor generation and display system that displays a graphical cursor at a user-controllable position on the display. The controller includes a first sensor, such as a motion sensor, responsive to user movement of a first type producing first sensor data. The controller includes a second sensor, such as a touch-responsive touchpad sensor, responsive to user movement of a second type different from the first type producing second sensor data.

The controller and/or the electronics product coupled to the display further includes at least one processor that calculates a hybrid cursor movement signal having a large scale movement component and a fine scale movement component. The processor or processors calculate the large scale movement component based on the first sensor data to which is applied a sensitivity parameter based on the second sensor data. The processor or processors also calculate the fine scale movement component based on the second sensor data to which is applied a sensitivity parameter based on the first sensor data.

The controller further includes transmitter for wirelessly communicating the hybrid cursor movement signal to the cursor generation and display system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
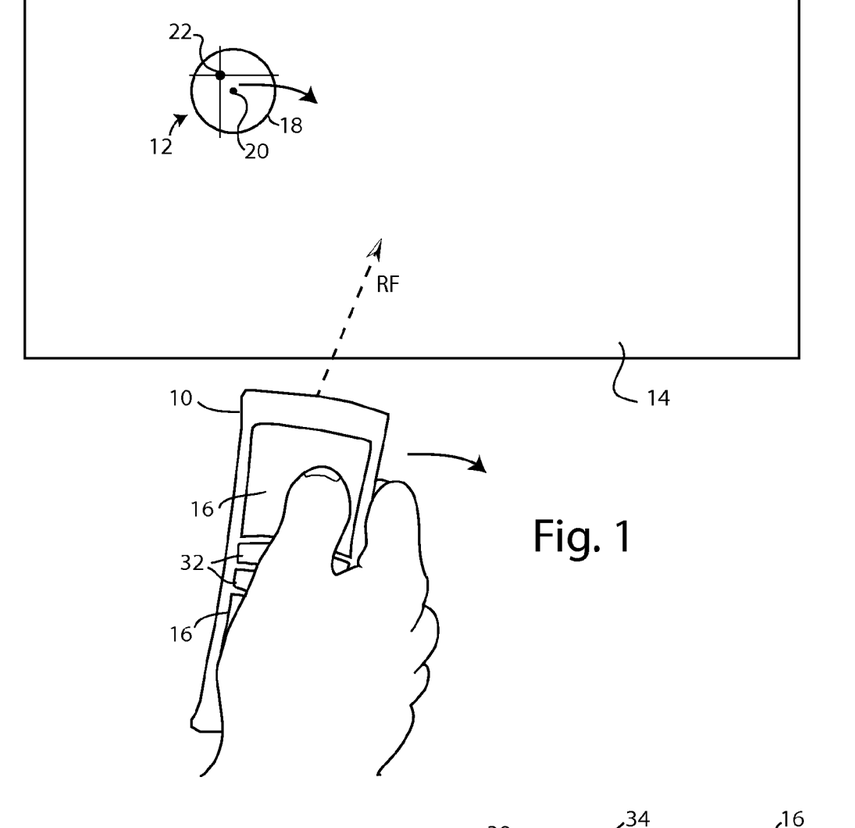
FIG. 1 is a perspective view of an exemplary handheld controller being used to control an electronically generated pointer or cursor on a display.
Figure 12:
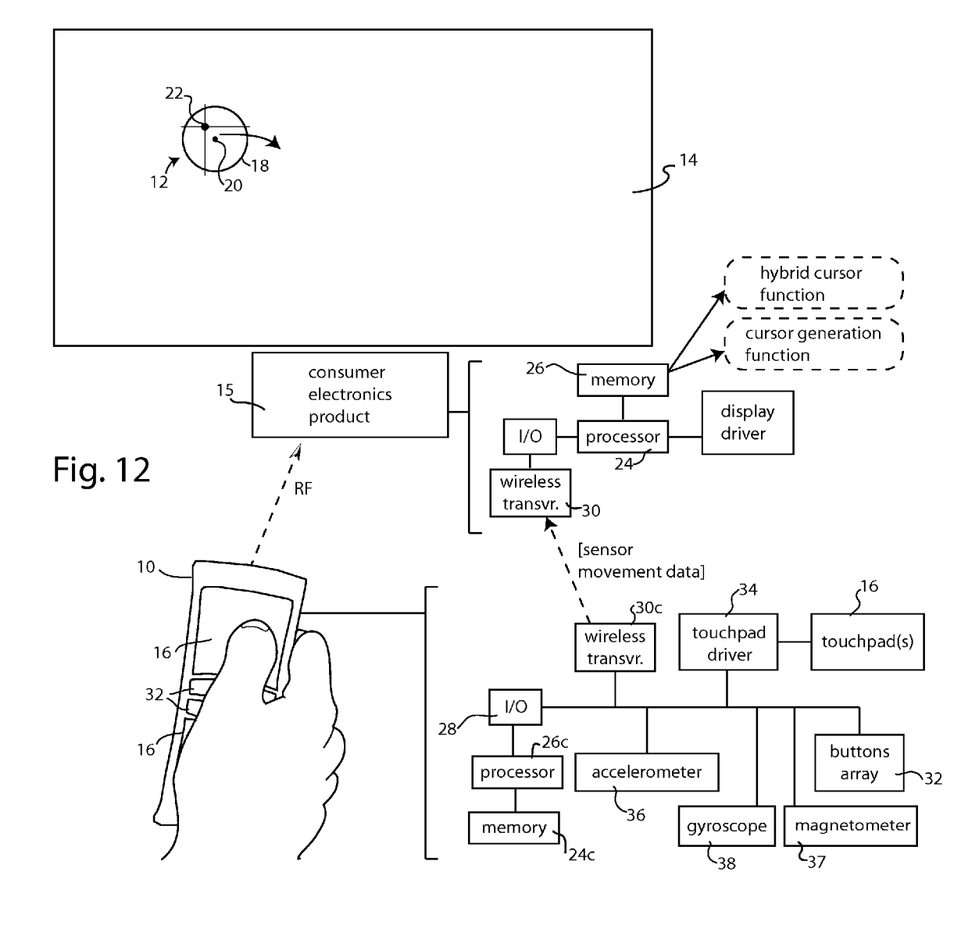
FIG. 12 illustrates an alternate embodiment where processor is deployed separate from handheld controller.

Referring to FIG. 1, a first embodiment of the hybrid pointing apparatus will now be described. In this embodiment, a handheld controller 10 controls the position, movement and appearance of cursor 12 upon display 14. Display 14 may be, for example, the display screen of a consumer electronics entertainment device, such as a widescreen television. The handheld controller 10 communicates wirelessly as by radio frequency (RF) signaling using, for example, wireless WiFi, Bluetooth or the like. The processor and associated electronics for implementing the hybrid pointing system may be packaged entirely within the handheld controller or may be distributed between the handheld controller and the consumer electronics entertainment device. Thus FIG. 12 shows an alternate embodiment where the electronics are distributed between the handheld controller and a receiver device.

In the illustrated embodiment, the handheld controller includes at least one touchpad 16 and also includes embedded motion sensing circuitry (discussed below) to detect in-air movement of the controller 10. The handheld controller thus provides two sources of sensor data: in-air motion data and touchpad data that are combined in a hybrid fashion to control how the cursor 12 appears on display 14 and how it moves. More specifically, the cursor 12 defines a rough pointer region 18, centered at 20, and a precise pointer 22 disposed within rough pointer region 18. As will be more fully described, in-air movement of the controller 10, such as movement from side to side, causes the rough pointer region (and precise pointer 22 within) to move about the screen, generally tracking with how the user waves the controller in the air. Thus the cursor, and specifically the rough pointer region of the cursor, effects large scale movement about the screen. By touching the touchpad 16 with a thumb or finger, the user controls the precise pointer 22 within the rough pointer region 18. Thus the cursor, and specifically the precise pointer of the cursor, effects fine scale movement within the rough pointer region. As will be described, the overall size of the rough pointer region varies depending on how the user manipulates the controller.

Figure 2:
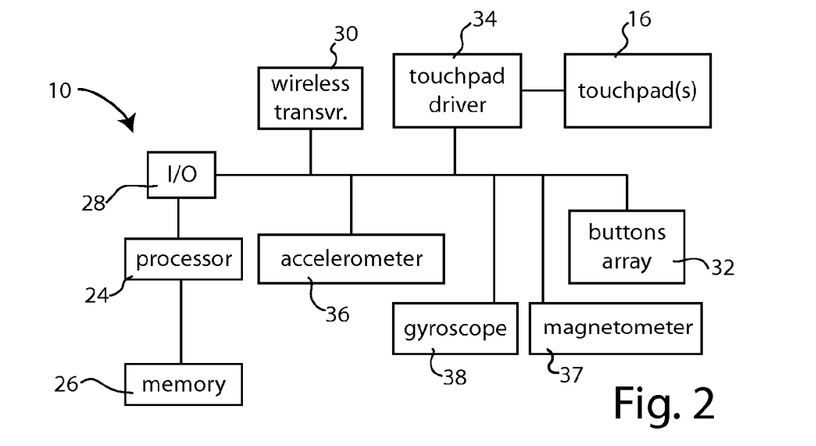
FIG. 2 is a hardware block diagram of the exemplary controller shown in FIG. 1.

Referring to FIG. 2, the controller 10 includes a processor 24 with associated memory 26. Memory 26 serves as a non-transitory computer-readable medium for storing the program instructions operated upon by processor 24 to implement the functionality described below. Memory 26 also stores data values from the sensors, internal parameter values, intermediate values calculated by processor 24 and output data values used to control the cursor's position, movement and appearance. The processor 24 is coupled to an input-output (I/O) interface circuit 28 that communicates with a variety of different sensors and devices as illustrated.

Coupled to the I/O interface 28 is a wireless transceiver 30 used to communicate by radio frequency with electronic circuitry associated with display 14 (FIG. 1). In the exemplary embodiment, the controller 10 includes a plurality of pushbuttons comprising a buttons array 32. The user can press these buttons selectively to perform certain frequently used operations such as changing channels or increasing/decreasing audio volume. As previously noted, the controller includes at least one touchpad 16 (two touchpads are provided in the embodiment shown in FIG. 1 making the controller bilaterally symmetrical). The touchpads are coupled through a touchpad driver circuit 34 as illustrated.

To sense in-air motion, the controller includes one or more inertial sensors such as accelerometer 36, magnetometer 37 and gyroscope 38. The accelerometer produces a signal indicative of the second derivative of linear motion. The accelerometer 36 of the preferred embodiment is a three-axis accelerometer that measures the second derivative of linear motion in a three-dimensional reference frame. Gyroscope 38 produces a signal indicative of rotation and thus has the ability to measure the rate of rotation about a particular axis. The magnetometer 37 produces a signal indicative of the compass pointing direction.

A first embodiment uses only gyroscope 38. This embodiment has the advantage of low cost. However, the gyroscope-only solution may experience some drift. To reduce the effect of this drift, the accelerometer may be combined with a gyroscope. A third embodiment adds the magnetometer 37 to the accelerometer and gyroscope. Addition of the magnetometer further reduces problems with drift and gives the controller knowledge of actual pointing direction with respect to a geographic reference frame, such as true North-South-East-West, for example; as opposed to merely relative motion information.

As an alternative or addition to inertial sensors, an optical tracking system may also be used. The optical tracking system uses an infrared camera on the remote control, which tracks infrared light emitting diodes disposed along the top or bottom of the display.

As previously noted, the processor and electronics for implementing the hybrid pointing system and method can be deployed in the handheld controller alone, or distributed across other components, such as a receiver, blue ray disc player, television receiver, audio-video processor and the like. See FIG. 12, for example.

Referring to FIG. 12, the display is coupled to a consumer electronics component, such as a receiver, blue ray disc player, television receiver, audio-video processor and the like. The processor and electronics used to implement the hybrid pointing system are distributed across the controller and consumer electronics product. In other words, some of the components making up the hybrid pointing system are deployed within the handheld controller while other components are deployed within the consumer electronics product. While there are many options, FIG. 12 illustrates one possible distribution where the sensors 16, 36, 37 and 38 are disposed within the handheld controller and the processor 24 that calculates the hybrid cursor movement signal is disposed separate from the handheld controller, such as within the consumer electronics product 15. If desired, the processor (or processors) used to implement the hybrid pointing system may be shared with the cursor generation and display system or define part of the cursor generation and display system.

The handheld controller includes a processor 26c with associated memory 24c that communicates through its input/output circuit 28 to supply sensor movement data (obtained from the touchpads 16 and from the motion sensors: accelerometer 36, magnetometer 37 and gyroscope 38) to the consumer electronics product 15 via the wireless transceiver pair: transceiver 30c (on the handheld controller) and transceiver 30 (on the consumer electronics product).

The processor 24 within the consumer electronics product then uses this sensor movement data to calculate the hybrid cursor movement signal and the cursor size data.

Figure 3A:
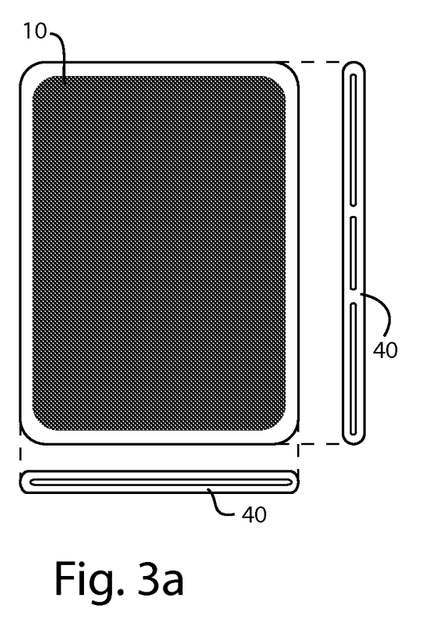
FIGS. 3a and 3b illustrate an alternative embodiment featuring gesture sensors disposed about the periphery of a touch-sensitive controller.
Figure 3B:
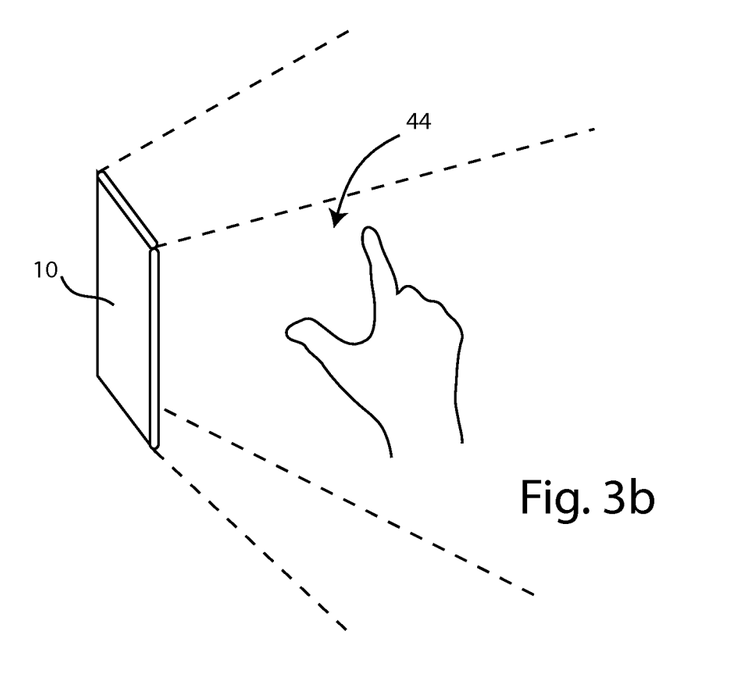
Figure 4:
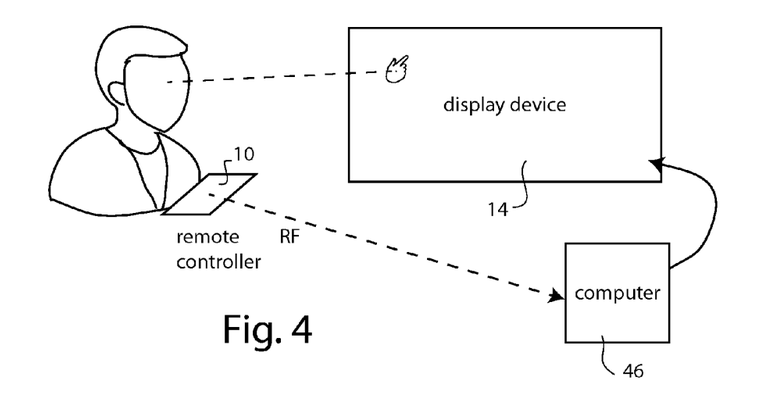
FIG. 4 illustrates the controller wirelessly operating a computer having an associated display device.

In general, the hybrid pointing system and method can be implemented using any plural number of sensors (two or more). The controller 10 of FIGS. 1 and 2 uses two sensors: an in-air motion sensor and a touchpad sensor. This is a special case of the more general case where a plurality n sensors may be used. Thus the hybrid pointing system and method may, for example, combine the outputs from three or more sensors in a particular application. Moreover, while the plural sensors are each disparate in nature (the in-air motion sensor provides data that is different in kind from the data provided by the touchpad sensor), many options are possible besides the ones described in FIG. 1. For example, as shown in FIGS. 3a and 3b, the touchpad 16 can be incorporated into a device having non-contact gestures 40 that sense in-air motion of the user's hand 42 within the near field region 44 proximate the controller 10. Variations in hardware components are also possible. FIG. 4 shows yet another embodiment where the remote controller 10 communicates wirelessly with a computer 46 and the display device 14 is attached to the computer.

Figure 5:
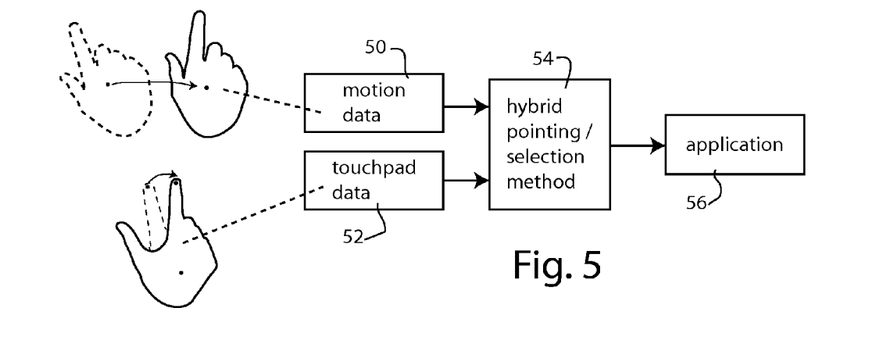
FIG. 5 is a simplified data flow diagram illustrating the hybrid pointing and selection method used to control an application.

The system and method takes signals from disparate sensors and combines them in a unique, collaborative way. In this regard, the embodiment illustrated in FIG. 1 is a two-sensor embodiment where motion data and touchpad data are combined. FIG. 5 shows this concept. Motion data 50, obtained from accelerometer 36 and/or gyroscope 38 (FIG. 2), and touchpad data 52, obtained from touchpad 16, are supplied to a processor implementing a hybrid pointing/selection method 54 which combines the respective data in a collaborative way. Although motion data are used to control the rough pointer region, and touchpad data are used to control the precise pointer, the motion and touchpad data cross-pollenate one another, such that rough pointer movement is also effected by touchpad data and precise pointer movement is effected by motion data.

The method 54 then supplies an application 56 which may handle the actual on-screen cursor generation. In other words, application 56 is responsible for generating the graphical appearance of the cursor and places that cursor at a location on the display based on the results of the hybrid pointing/selection method 54. Of course, application 56 is not necessarily limited to generating the on-screen cursor. Additional application functionality can also be implemented. In this regard, the hybrid pointing/selection method 54 provides the raw cursor location and cursor size information that an application can use to achieve the desired goals of the application. Thus, a video game application, for example, might use the location and cursor size information from method 54 to control movement of a character or player in the game. In such an implementation, the rough pointer movement data might be used to control the position of the character's body, while the precise pointer movement data might be used to control the character's arms.

The hybrid pointing/selection method 54 offers several advantages. One advantage is to enable cascading control where each sensor controls a different range of precision. This has been illustrated in FIG. 6 where three sensors have been utilized. The first sensor responds to a first positional range 60 represented diagrammatically in FIG. 6 by bar graph. The user's input is captured by the first sensor to identify or highlight a first selection range 62, which is then amplified and presented as second positional range 64. In this amplified view, the user's selection is made responsive to the section sensor, allowing the user to more precisely highlight or select the second selection range 66. Range 66 is then amplified as third positional range 68, allowing the user to finally highlight a very precise point 70 within the third selection range 72.

Figure 6:
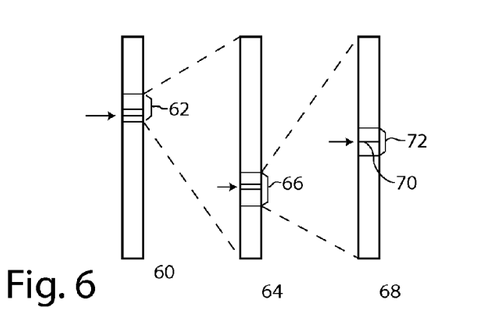
FIG. 6 is a cascade diagram illustrating how each of a plurality of sensors are combined in a cascading manner to achieve fast yet accurate user manipulation of the cursor.

By virtue of the hybrid manner in which the respective sensor data are combined, the output of one stage is also related to the sensor signals of other stages. Each sensor's range may thus be used in a cascading manner where the output of a first stage is used to constrain the search space of the next stage. In other words, signal processing of any sensor source level depends on the signals from other sensor sources. The result is an accurate, stable and responsive cursor position and cursor size that dynamically adapts to the user's intentions.

Figure 7:
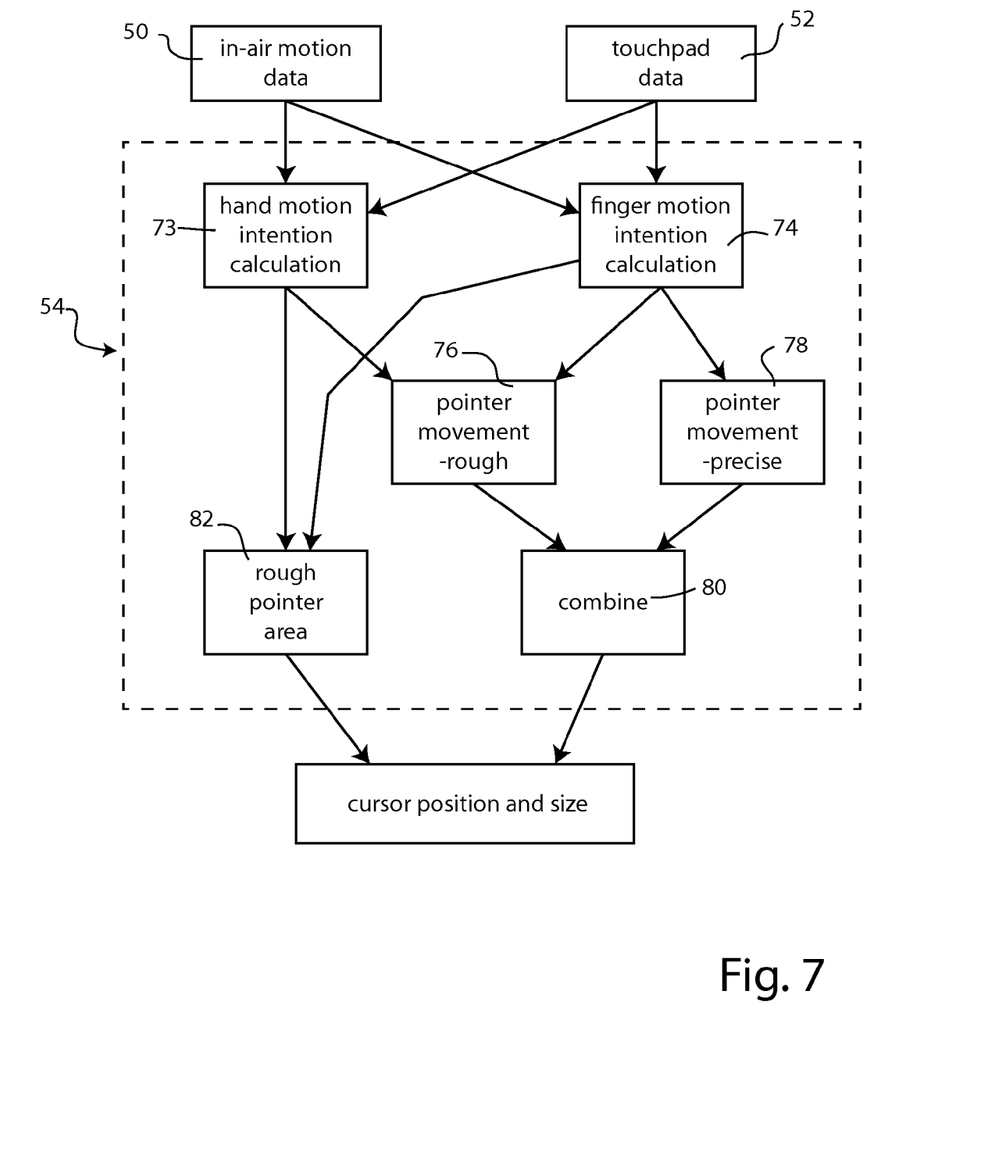
FIG. 7 is a detailed data flow diagram depicting a two-sensor embodiment where in-air motion data and touchpad data are combined.

The hybrid pointing/selection method 54 is preferably implemented by programming processor 24 (FIG. 2) using program instructions stored in memory 26. FIG. 7 is a block diagram illustrating how processor 24 is programmed. Raw in-air motion data 50 and raw touchpad data 52 are supplied to the hybrid pointing/selection method 54, each for two different purposes. Motion data 50 are fed to the hand motion intention calculation processor 73 to extract the user's intentions from hand movement gestures being made. Motion data 50 are also supplied to the finger motion intention calculation processor 74 so that the manner in which the user is performing hand gestural movement will have some bearing on how the system interprets finger motion obtained from the touchpad data 52.

In a similar fashion, touchpad data 52 are fed to the finger motion intention calculation processor 74, and also to the hand motion intention calculation processor 73. Thus, the hand motion intention calculation results are somewhat dependent on what the user is doing with the touchpad while the in-air gestural motions are being performed. The respective hand motion intention calculation processors generate motion sensitivity values represented herein by $\alpha$. More specifically, hand motion intention calculation processor 72 computes $\alpha_{hand}$ as follows:

$$\alpha_{hand,t} = \begin{cases} 1, & \text{if finger is not touching the touchpad} \\ \dfrac{1}{1 + \left|\Delta \vec{P}^*_{finger,t}\right| A_0}, & \text{if finger is touching the touchpad} \end{cases} \quad \text{EQUATION 1}$$

$A_0$ is constant, e.g., =10

Similarly, finger motion intention calculation processor 74 generates the motion sensitivity value $\alpha_{finger}$ as follows:

$$\alpha_{finger,t} = \frac{1}{1 + \left|\Delta \vec{P}^*_{hand,t}\right| B_0} \quad \text{EQUATION 2}$$

$B_0$ is constant; e.g., =10

=> $\alpha_{finger}$ is high when user is not performing in-the-air motion, and lower when user is performing intensive in-the-air motion.

These motion sensitivity parameters serve as contribution factors for the associated sensor. The rough pointer movement processor 76 calculates the rough pointer movement variable: $\Delta \vec{P}_{hand}$ as follows:

$$\Delta \vec{P}_{hand,t} = \alpha_{hand,t} (\vec{P}^*_{hand,t} - \vec{P}^*_{hand,t-1}) \quad \text{EQUATION 3:}$$

Note: $\Delta \vec{P}_{hand,t}$ is a vector quantity that changes as a function of time. The $\vec{P}^*_{hand,t}$ and $\vec{P}^*_{hand,t-1}$ are raw input values from the sensor.

Similarly, precise pointer movement processor 78 calculates the precise pointer value: $\Delta_t \vec{P}_{inger}$ as follows:

$$\Delta \vec{P}_{finger,t} = \alpha_{finger,t} (\vec{P}^*_{finger,t} - \vec{P}^*_{finger,t-1}) \quad \text{EQUATION 4:}$$

Note: $\Delta \vec{P}_{finger,t}$ is a vector quantity that changes as a function of time. The $\vec{P}^*_{finger,t}$ and $\vec{P}^*_{finger,t-1}$ are raw input values from the sensor.

The resultant values from processors 76 and 78 are then combined by processor 80 to generate the vector D representing the cursor position as follows:

$$\vec{D}_t = \vec{D}_{t-1} + \sum_{n=1}^{N} S_n \cdot \Delta \vec{P}_{n-t} \quad \text{EQUATION 5}$$

For hand, finger embodiment: $\vec{D}_t = \vec{D}_{t-1} + (S_{hand} \cdot \Delta \vec{P}_{hand,t} + S_{finger} \cdot \Delta \vec{P}_{finger,t})$ => Movement of cursor is a combination of movement data from all sensors.

Scale Factor S:

For Embodiment 1

$S_{hand}=1$, $S_{finger}$ is smaller than 1. e.g., =0.2
=> Hand in-the-air motion can cover full screen space; finger motion covers smaller region.

In addition to providing cursor position information, the hybrid pointing/selection method 54 can also control the visual appearance of the cursor such as controlling the rough pointer region as was illustrated at 18 in FIG. 1. Thus, the hybrid pointing/selection method 54 includes a rough pointer region appearance processor 82 that uses the parameters $\alpha_{hand}$ and $\alpha_{finger}$ to generate a Cursor$_{diameter}$ as follows:

$$C_{diameter}=S_{finger}*\alpha_{finger,t} \quad \text{EQUATION 6:}$$

=> Cursor size is defined by scale factor of finger motion, and reduced to smaller size when $\alpha_{finger}$ is small (e.g., Cursor size is small when user is performing intensive hand in-the-air motion, and becomes larger when user's hand is steady in the air).

Figure 8:
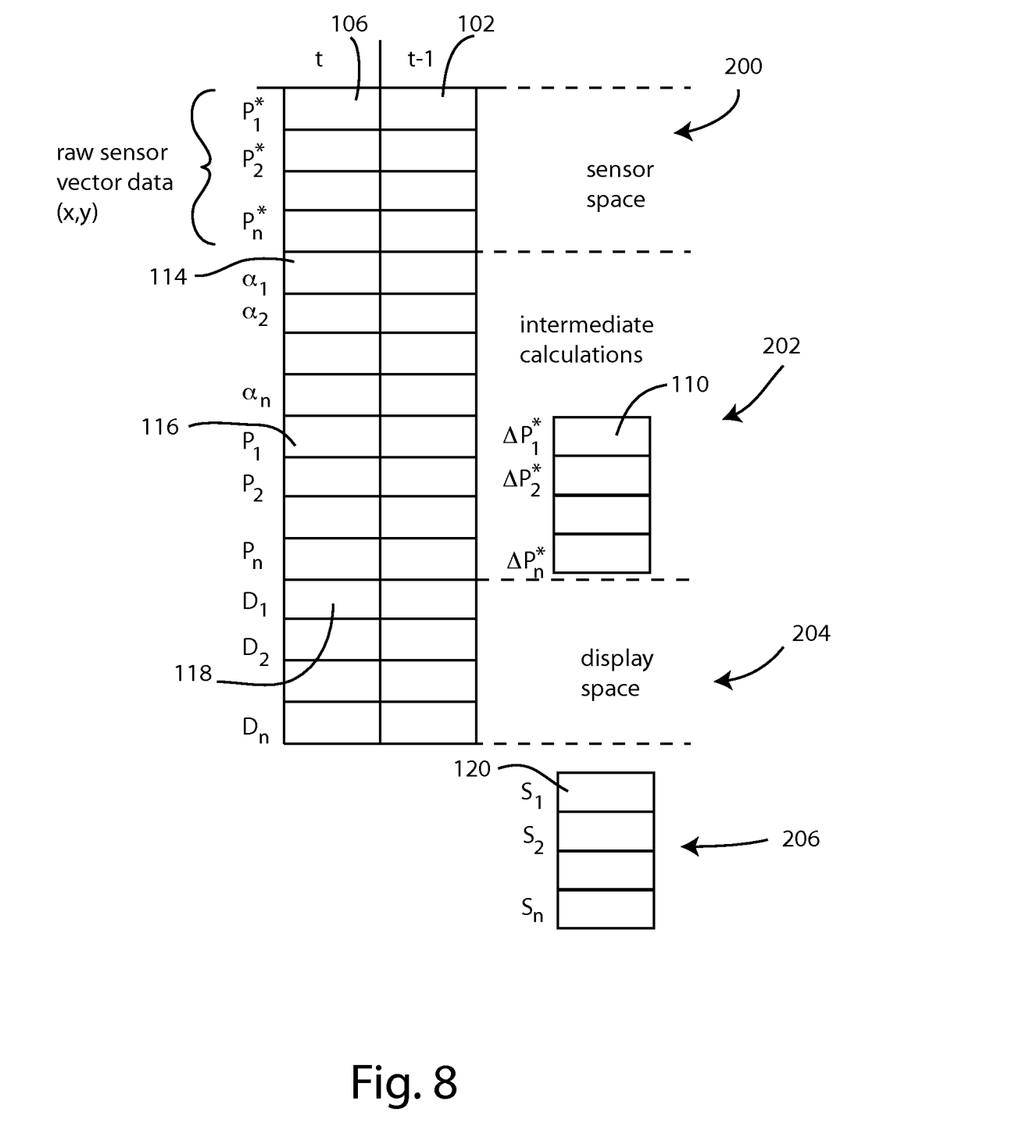
FIG. 8 is a data structure diagram useful in understanding how the hybrid pointing technique may be implemented by a processor.
Figure 9:
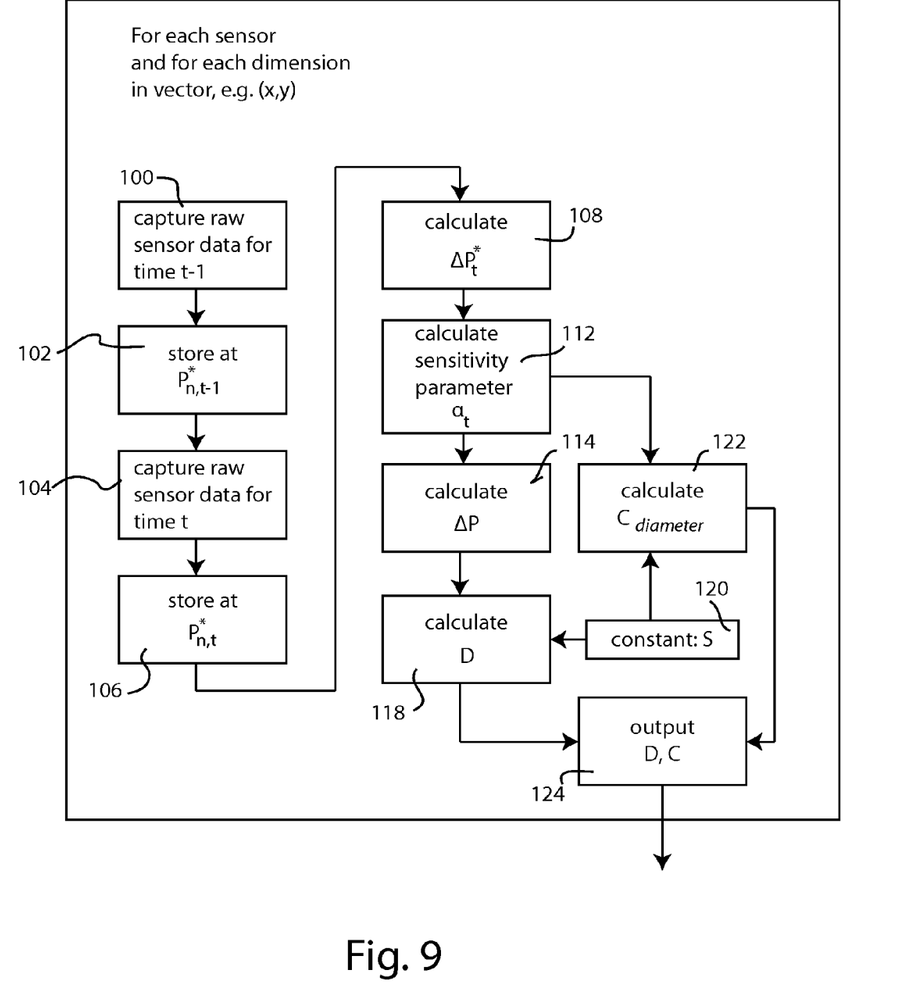
FIG. 9 is a flow chart depicting how the processor is programmed to interact with the data structure of FIG. 8 to provide hybrid control of the cursor location, movement and cursor size.

For FIGS. 8 and 9, the manner of programming processor 24 will now be discussed. Processor 24 (FIG. 2) is programmed to implement each of the processors described in FIG. 7. While all of these processing functions can be implemented using a single processor such as a microprocessor disposed within controller 10, alternative embodiments are possible where multiple processors are used and distributed among plural components, such as the controller 10 and the consumer product being controlled by controller 10 or other suitable components. More specifically, FIG. 8 depicts a data structure that is implemented in memory 26 and the processor is programmed to perform the steps and calculations illustrated in FIG. 9. Recognize that the preferred embodiment works with multiple sensors and multi-dimensional vector quantities. For example, the embodiment shown in FIG. 1 uses two sensors and operates upon vector positions having both horizontal and vertical position (x,y). Thus, in FIG. 9, the illustrated steps are intended to be performed for each sensor and for each dimension in the vector. FIG. 9 illustrates the sequence for a single sensor within the vector, and it will be understood that the same process would be repeated for each dimension of a given sensor and then further repeated (all dimensions) for the other sensor or sensors.

At step 100, the processor captures raw sensor data for time t−1. In other words, at a designated starting time (t−1), the raw sensor data are captured and stored in the data structure at 102. Note this data structure has also been labeled in FIG. 8. Next, at 104 the processor captures raw sensor data for a later time and stores that raw data at 106. Again, note this storage has also been labeled at FIG. 8.

Once two raw sensor data values have been obtained for the different times t−1 and t, a difference calculation is performed at 108 and then temporarily stored at 110 (shown in FIG. 8). This intermediate difference calculation is then used to calculate the sensitivity parameter at 112. In this regard, Equations 1 and 2 above are exemplary sensitivity parameter calculations for the hand and finger embodiment of FIG. 1. The sensitivity parameter, so calculated, may then be stored at 114 (FIG. 8).

Next, at step 114 the sensor movement value is calculated. There are two methods to perform this step. The first method calculates the sensor movement as a relative value by multiplying the sensitivity parameter with the calculated difference stored at 110. See Equation 7 below. The second method performs an absolute movement calculation where a position value is calculated and stored at 116 (FIG. 8) by adding the relative movement value to a previously stored absolute position from time t−1. See Equation 8 below.

$$\Delta \vec{P}_{n,t}=\alpha_{n,t}\cdot(\vec{P}^*_{n,t}-\vec{P}^*_{n,t-1}) \quad \text{EQUATION 7:}$$

$$\Delta \vec{P}_{n,t}=\alpha_{n,t}\cdot(\vec{P}^*_{n,t}-\vec{P}_{n,t-1}), \text{ and update: } \vec{P}_{n,t}=\vec{P}_{n,t-1}+\Delta \vec{P}_{n,t} \quad \text{EQUATION 8:}$$

Then at step 118, the resultant cursor coordinate value D is calculated and stored at 118 (FIG. 8) using the calculation of equation 5 above. This calculation uses a constant value S stored at 120.

Meanwhile, the cursor size calculation is performed at 122 using both the sensitivity parameters calculated at 112 and also using the constant S at 120. In the illustrated embodiment, the cursor is presented as a circle that has a diameter that dynamically changes. It will be appreciated that cursors of other shapes and configurations are also possible, in which case the calculated value at 122 might represent some other parameter rather than diameter.

The calculated position D and cursor size C are then output at 124. This output is then fed to the application 56 (FIG. 5).

The procedure thus described is figuratively repeated for subsequent time intervals so that the value at time t for a current iteration becomes the value for t−1 for the next iteration. With reference to the data structure diagram of FIG. 8, it can be seen that the values stored at 200 correspond to raw data measured within the sensor space, whereas values stored at 204 represent calculated positions within the display space (i.e., coordinates on the display screen). Values stored at 202 represent intermediate calculations and the values at 206 represent constants.

Figure 10A:
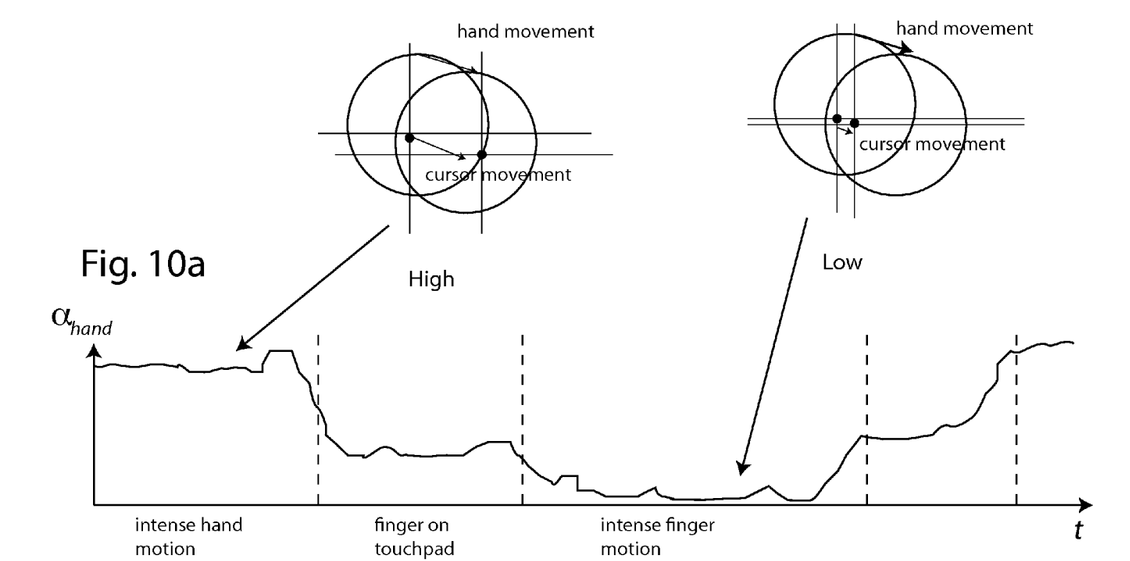
FIGS. 10a and 10b graphically illustrate how the motion sensitivity parameters perform under exemplary use cases.
Figure 10B:
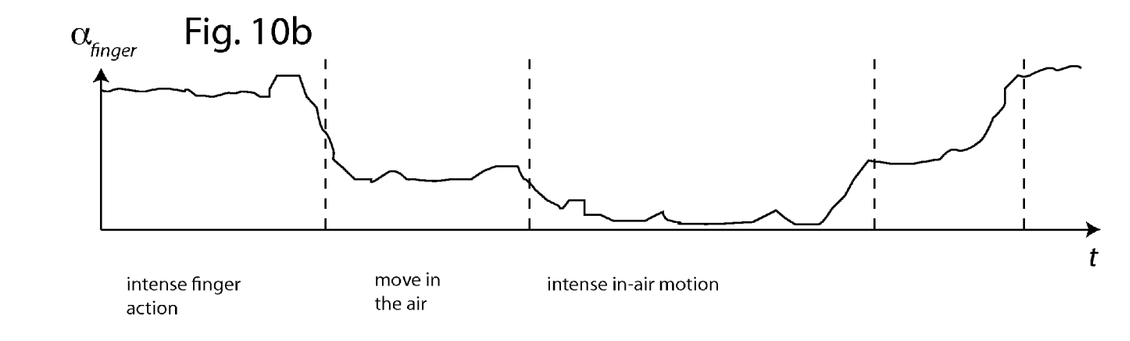

Referring now to FIGS. 10a and 10b, one can see how the sensitivity parameters provide varying degrees of influence depending on what the user is doing and these changes in sensitivity parameters are reflected in how the cursor moves on the display. In FIG. 10a, the example begins with intense hand motion followed by the user's finger being placed on the touchpad, which is then followed by intense finger motion. As illustrated in FIG. 10b, the example begins with intense finger action, followed by movement in the air and then followed by intense in-air motion. As can be seen, the sensitivity parameter for the hand is high when the user is only performing in-air motion and lower when the user is performing intense finger motion. Conversely, the sensitivity parameter for the finger is high when the user is not performing any in-air motion and lower when the user is performing intense in-air motion.

Figure 11:
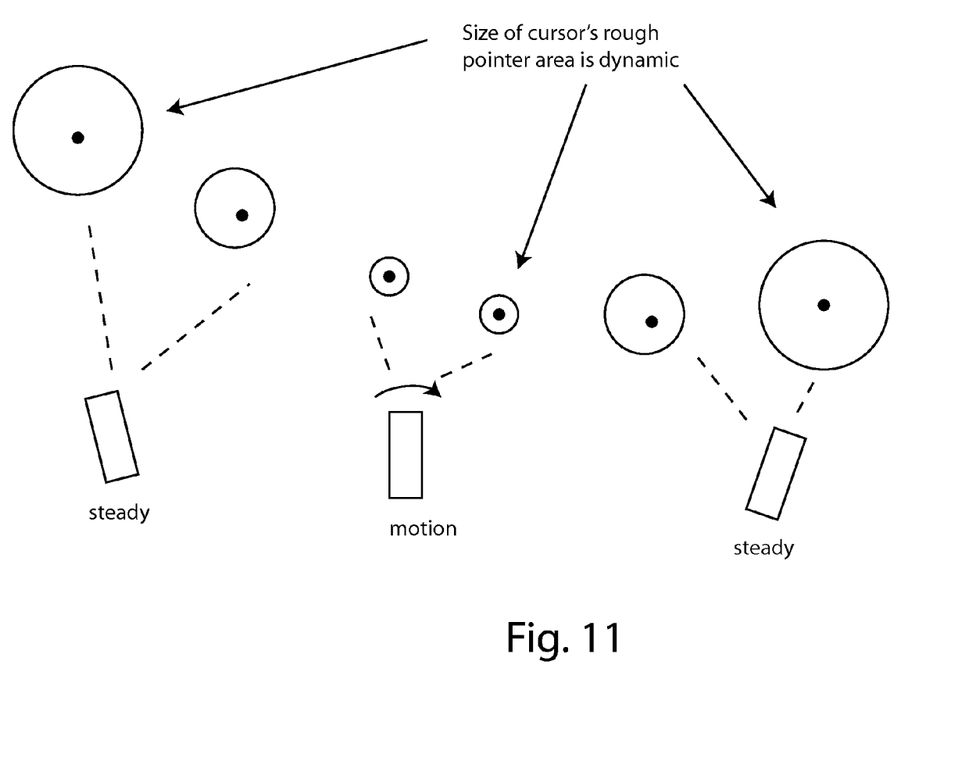
FIG. 11 illustrates behavior of the dynamic rough pointer region.

FIG. 11 illustrates how the size of the rough pointer region dynamically changes based on motion. The rough pointer region is small when the user is performing intense in-air motion and becomes larger when the user's hand is steady in the air.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller for user interaction with displayed elements on an electronic display having a cursor generation and display system that displays a graphic cursor at a user-controllable position on the display, comprising:
   a handheld controller;
   a first sensor disposed in said handheld controller and responsive to user movement of a first type producing first sensor data;
   a second sensor disposed in said handheld controller and responsive to user movement of a second type different from the first type producing second sensor data;
   at least one processor that calculates a hybrid cursor movement signal having a large scale movement component and a fine scale movement component;
   wherein the graphic cursor includes at least a rough pointer area and a precise pointer smaller than the rough pointer area and positioned in the rough pointer area;
   wherein the at least one processor calculates the large scale movement component based on the first sensor data to which is applied a sensitivity parameter based on the second sensor data;
   wherein the at least one processor calculates the fine scale movement component based on the second sensor data to which is applied a sensitivity parameter based on the first sensor data;
   a transmitter for wirelessly communicating between the handheld controller, the cursor generation and display system; and
   wherein the at least one processor monitors motion of the handheld controller and dynamically changes the size of the rough pointer area based on motion of the handheld controller such that the rough pointer area is smaller when the handheld controller is moving than it is when the handheld controller is stationary.

2. The controller of claim 1 wherein the at least one processor is disposed within the handheld controller.

3. The controller of claim 1 wherein the at least one processor is disposed separate from the handheld controller.

4. The controller of claim 1 wherein the at least one processor forms part of the cursor generation and display system.

5. The controller of claim 1 wherein said at least one processor calculates a cursor position value based on said first and second sensor data and supplies said cursor position value to the cursor generation and display system.

6. The controller of claim 1 wherein said at least one processor calculates plural cursor position values based on said first and second sensor data and supplies said plural cursor position values to the cursor generation and display system.

7. The controller of claim 6 wherein a first one of said plural cursor position values is associated with the displayed rough pointer area and a second one of said plural cursor position values is associated with the displayed precise pointer disposed within said rough pointer area.

8. The controller of claim 7 wherein the displayed rough pointer area moves in response to said large scale movement component.

9. The controller of claim 7 wherein the displayed precise pointer moves in response to said fine scale movement.

10. The controller of claim 1 wherein said large scale movement component provides information by which the cursor generation and display system generates and displays the rough pointer area.

11. The controller of claim 1 wherein said fine scale movement component provides information by which the cursor generation and display system generates and displays the precise pointer.

12. The controller of claim 1 wherein said large scale movement component provides information by which the cursor generation and display system generates and displays the rough pointer area and by which the cursor generation and display system generates and displays the precise pointer within said rough pointer area.

13. The controller of claim 1 wherein said at least one processor calculates a cursor size signal based on at least one of said first and second sensor data and communicates said cursor size signal to said cursor generation and display system.

14. The controller of claim 1 wherein said first sensor is a motion sensor.

15. The controller of claim 1 wherein said second sensor is a touchpad sensor.

16. The controller of claim 1 further comprising a handheld case and wherein said first sensor is a motion sensor disposed within said case for sensing motion of said case when manipulated by a user.

17. The controller of claim 1 wherein said first sensor is a motion sensor that detects gestural movements of a user.

18. A handheld controller for user interaction with displayed elements on an electronic display having a cursor generation and display system that displays a graphic cursor at a user-controllable position on the display, comprising:
   an in-air motion sensor that produces a first signal indicative of the movement of the handheld controller with respect to a first reference frame;
   a touch sensor responsive to contacting motion of a user's finger or thumb that produces a second signal indicative of the movement of the user's finger or thumb with respect to a second reference frame associated with a surface area of the touch sensor; and
   at least one processor that calculates and communicates cursor size and position data to the cursor generation and display system,
   said at least one processor calculating rough size and rough position data which define with respect to said cursor a rough pointer area of predetermined size positioned at a display location dictated by the rough position data,
   said at least one processor calculating precise pointer position data which define with respect to said cursor a precise pointer upon the display at a display location within the rough pointer area,
   said at least one processor using a combination of said first signal and said second signal to produce movement of the rough pointer area and to produce movement of the precise pointer within the rough pointer area, and
   wherein the at least one processor monitors motion of the handheld controller and dynamically changes the size of the rough pointer area based on motion of the handheld controller such that the rough pointer area is smaller when the handheld controller is moving than it is when the handheld controller is stationary.

19. The controller of claim 18 wherein said at least one processor calculates the rough pointer area to be of a size dependent upon at least one of said first and second signals.

20. The controller of claim 18 further comprising a transmitter for wirelessly effecting said communication between said at least one processor and the cursor generation and display system.

21. The controller of claim 18 wherein said at least one processor produces cascading cursor control whereby the in-air motion sensor substantially controls positioning of the rough pointer area and whereby the touch sensor substantially controls positioning of the precise pointer within the rough pointer area.

22. A method of providing cursor control using a handheld controller having plural disparate sensors comprising:
sensing a first condition indicative of gestural movement by a user and producing a first signal indicative thereof;
sensing a second condition indicative of touch manipulation by the user and producing a second signal indicative thereof;
combining said first and second signals using a hybrid calculation process to generate a large scale movement component and a fine scale movement component;
using the large scale movement component to control a displayed rough pointer area and using the fine scale movement component to control a displayed precise pointer within said rough pointer area; and
using at least one processor to monitor motion of the handheld controller and to dynamically change the size of the rough pointer area based on motion of the handheld controller causing the rough pointer area to be smaller when the handheld controller is moving than it is when the handheld controller is stationary.

23. The method of claim 22 further comprising using the fine scale movement component to generate a large scale sensitivity parameter and applying said large scale sensitivity parameter in controlling the rough pointer area.

24. The method of claim 22 further comprising using the large scale movement component to generate a fine scale sensitivity parameter and applying said fine scale sensitivity parameter in controlling the precise pointer.

25. The method of claim 22 further comprising using at least one of said movement components to generate a cursor size value and using said cursor size value in generating the rough pointer area.

26. The method of claim 22 wherein said first condition is sensed using a motion sensor disposed within said handheld controller.

27. The method of claim 26 wherein the motion sensor is responsive to motion of the handheld controller with respect to a predefined reference frame.

28. The method of claim 26 wherein the motion sensor is responsive to gestural motion of the user's body.

29. The method of claim 22 wherein the second condition is sensed using a touchpad disposed within said handheld controller.

* * * * *